J. STILLMAN.

Improvement in Breech-Loading Fire-Arms.

No. 4,957. Reissued June 25, 1872.

Witnesses.

A. J. Tibbits

J. H. Shumway

Eli Whitney

Assignee of Jas. Stillman

Inventor

By his Atty.

Thos. Earle

UNITED STATES PATENT OFFICE.

JAMES STILLMAN, OF SPRINGFIELD, MASSACHUSETTS, ASSIGNOR TO ELI WHITNEY, OF NEW HAVEN, CONNECTICUT.

IMPROVEMENT IN BREECH-LOADING FIRE-ARMS.

Specification forming part of Letters Patent No. 50,507, dated October 17, 1865; reissue No. 4,957, dated June 25, 1872.

*To all whom it may concern:*

Be it known that I, JAMES STILLMAN, of Springfield, in the county of Hampden and State of Massachusetts, have invented a new Improvement in Breech-Loading Fire-Arms; and I do hereby declare the following, when taken in connection with the accompanying drawing and the letters of reference marked thereon, to be a full, clear, and exact description of the same, and which said drawing constitutes part of this specification, and represents in—

Figure 1:
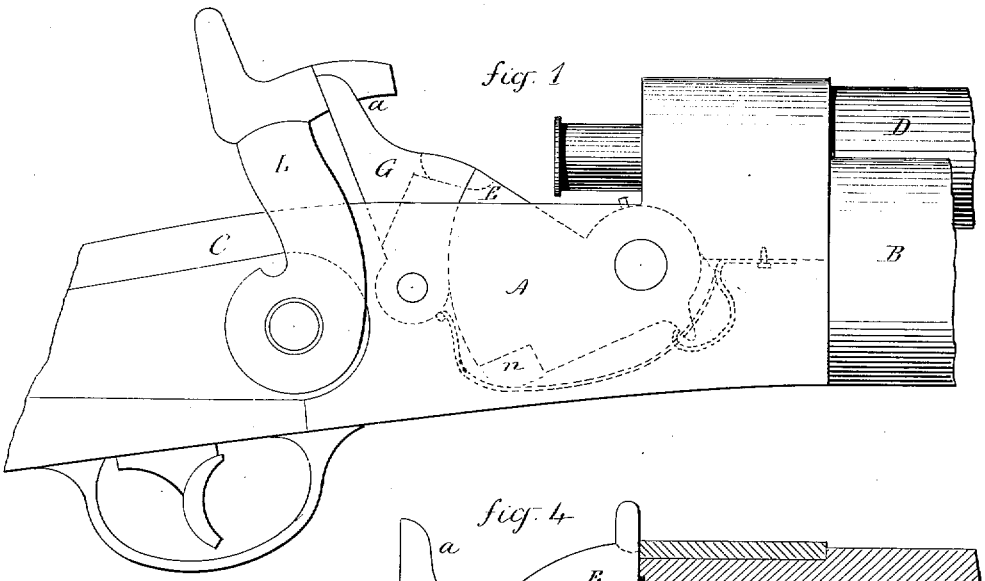
Figure 4:
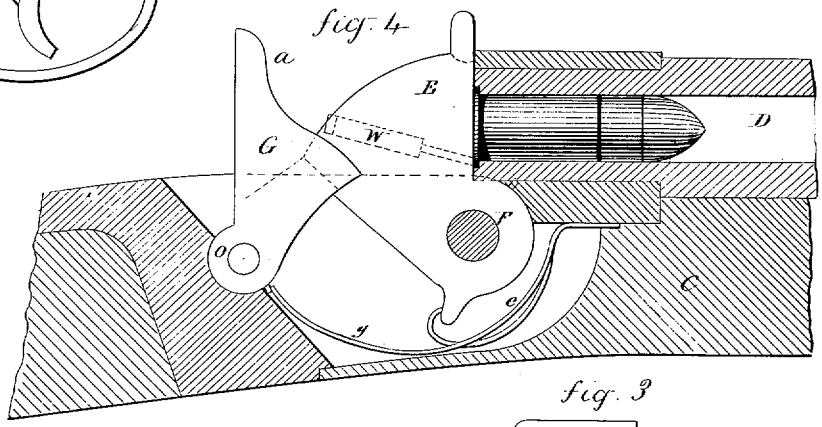
Figure 3:
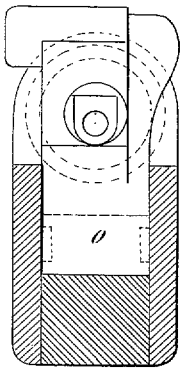
Figure 2:
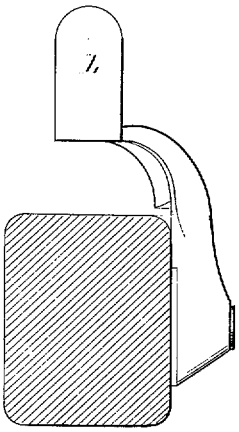

Figure 1 a side view, Figs. 2 and 3 transverse sections, and in Fig. 4 a longitudinal section.

This invention relates to an improvement in that class of breech-loading fire-arms in which a breech-block is hung upon a pivot below the barrel and in a line transversely to the axis of the barrel, so that when the block is thrown back and down the rear of the barrel will be open for the insertion or removal of the cartridge or shell, and when thrown up against the barrel will form a recoil-block to resist the explosion.

The object of this invention is to securely lock the breech-block independent of the hammer; and it consists in the arrangement of the breech-block upon a pivot below the barrel, and in a line transverse to the axis of the barrel, so that the said block will be thrown back and down to open the breech, and turned up against the rear of the barrel to close the breech, combined with a cam or swinging lever independent of the hammer, having its pivot parallel to the pivot upon which the breech-block turns, and in such relative position to each other that the throwing back of the said cam will release the said breech-block, and allow the opening of the breech, and when the breech-block is thrown up to close the breech, the said cam will automatically drop into the rear of the said breech-block to hold it firmly against the rear of the barrel to resist the explosion of the cartridge.

A is the frame, constructed for the reception of the stock at B and C, in substantially the usual manner; D, the barrel, secured to the frame and open at the breech to receive the cartridge in the usual manner for breech loading fire-arms. E is the breech-block pivoted at F, the said pivot being in a line transverse to the axis of the barrel, the said block constructed as shown, so that when in the position in Fig. 4, it will close the rear of the barrel; but when turned away, as in Fig. 1, it will open the rear for the insertion or removal of the cartridge or shell, as the case may be. A suitable spring, *e*, is arranged in connection with the said breech-block, so that when unsupported the said spring will open or throw back the breech-block, as denoted in Fig. 1. In the rear of said breech-block a cam, G, is arranged upon a pivot, *o*, the said pivot being parallel to the pivot of the breech-block, and is combined with a spring, *g*, the tendency of which is to throw the said cam forward into the position denoted in Fig. 4. A notch or seat, *n*, seen in Fig. 1, is formed on the breech-block to receive the cam when the breech-block is up against the barrel, the cam being forced into that seat by means of the spring *g*, and there rests as a support for the breech-block. Upon the cam G is formed a thumb-piece, *a*, by which to operate the said cam; therefore, by placing the thumb upon the said part *a*, and drawing it back out of the notch or seat, or from beneath the breech-block, or until the breech-block is free, then the spring *e* will throw the breech-block back and down forward of the cam, as seen in Fig. 1, and against the block, and in that position the cam will rest until the breech-block is again raised, which is done by means of a suitable thumb-piece thereon, as denoted in Fig. 4, and when forced up to its place to close the rear of the barrel, the cam will, by the action of the spring *g*, fall into position in the rear of the said block, and there support the block, as before described. Through the breech-block a suitable firing-pin, W, is arranged, so that the hammer L, which is independent of both the cam and breech-piece, will, when thrown down, strike upon the said firing-pin to cause the discharge of the cartridge inserted into the barrel; but when the hammer is down it lies over the cam; hence in raising the cam the hammer will be brought to half-cock, which obviates the necessity of raising the hammer to half-cock, and then by another movement raising the cam.

It will be seen that the hammer cannot be thrown down from full-cock against the firing-pin unless all the parts are in their proper position, for if not in such position the hammer will strike the recoil-block and its stroke be arrested.

I claim as my invention—

1. The breech-block F, in combination with a spring, *e*, operating substantially as described, so that when the cam, which supports the breech-block against the barrel, is removed the said spring will automatically throw down the said breech-block to open the barrel.

2. The breech-block E, combined with a spring, *e*, and cam G, and its spring *g*, in substantially such relative position to each other, as described, so that the throwing back of the said cam releases the breech-block and allows the spring *e* to act on the said breech-block to open the barrel, and also that when the said breech-block is raised to close the barrel, the said cam will automatically drop in the rear of the said breech-block and lock it in its closed position, substantially as described.

3. The breech-block F, pivoted below and so as to swing to and from the rear of the barrel to open and close the same, combined with the cam G and its spring *g*, operating in the manner substantially as described, so that when the said breech-block is raised to close the barrel, the said cam will automatically drop in the rear of the said block, and lock it in its closed position.

4. The combination of the cam G, which locks the breech-block, with the hammer L, when arranged substantially as described, so that the throwing back of the cam will raise the hammer to half-cock.

JAMES STILLMAN.

Witnesses:

SAM. W. PORTER,
H. T. FITZ.